July 7, 1964

J. R. TAVIS 3,140,450

FORCE CONTROLLED VARIABLE REACTANCE TRANSDUCER

Filed Feb. 13, 1961

INVENTOR.
JOHN R. TAVIS
BY Christie, Parker & Hale
ATTORNEYS.

United States Patent Office 3,140,450
Patented July 7, 1964

3,140,450
FORCE CONTROLLED VARIABLE REACTANCE TRANSDUCER
John R. Tavis, Sierra Madre, Calif., assignor to Edcliff Instruments, Inc., Monrovia, Calif., a corporation of California
Filed Feb. 13, 1961, Ser. No. 88,823
8 Claims. (Cl. 331—40)

This invention relates to electromechanical transducers, and has reference to transducers in which variations in electrical reactance are utilized to measure variations in physical parameters such as, for example, pressure or acceleration. More particularly the invention is concerned with improvements in variable reactance transducers whereby the transducer output is, for practical purposes, essentially digital.

Variable reactance transducers commonly include a force responsive element which deflects along a predetermined path in accordance with applied force; for example, a deflectable pressure diaphragm. The deflection of the diaphragm is in turn employed to alter the reactance of one or more reactive circuit elements. Conventionally, the reactive circuit elements are connected in a bridge circuit or null balancing network wherefrom there is derived a voltage representative of the magnitude of variation in the physical parameter. See, for example, U.S. Patent No. 2,884,608, to Jessen, 1959.

With the advent of high-speed digital computers and data handling systems, there has arisen an ever increasing need for a good digital transducer capable of reading more or less directly into the digital systems in order to avoid the necessity for complex analog-to-digital conversion arrangements. So far as is known, a transducer satisfactory in this regard presently does not exist, despite an established need for such a device for at least ten years.

The transducer of the present invention provides a signal frequency output which varies extremely linearly with respect to the applied force representing the parameter being measured. The output frequency may start from zero and is extremely stable despite temperature variations. Theoretically, this is not precisely a digital transducer; however, for practical purposes, it is very nearly the equivalent. Because of the extreme linearity, the ability to start from zero frequency and the temperature stability, the frequency output from many such transducers can be easily and rapily sampled by serially time gating the transducer outputs directly to a frequency counter, the output from which can be entered directly into digital data handling systems.

In accordance with the present invention, the transducer comprises a force responsive element which deflects in accordance with applied force, first and second oscillators each having a resonant circuit containing a variable reactive element that controls the oscillator's frequency, means coupling the resonant circuit of the first oscillator to the one side of the force responsive element for altering the tuning thereof in accordance with deflection of the force responsive element, means coupling the resonant circuit of the second oscillator to the opposite side of the force responsive element for oppositely altering the tuning thereof in accordance with the same deflection, and means coupled to the first and second oscillators for deriving an output signal frequency representative of the difference in oscillator frequencies.

The foregoing construction may be achieved by taking similar reactive elements from the resonant circuits of two similar oscillators and mounting them on opposite sides of the force responsive element in alignment with its path of deflection. Each of these reactive elements includes a fixed structural portion and a movable structural portion the spacing between which determines the reactance of the element, hence determines the tuning of the resonant circuit of the corresponding oscillator. The movable structural portion of each reactive element is carried by the force responsive element whereby deflection of the force responsive element varies the spacing in the reactive elements oppositely. This is true because the force responsive element, in moving toward the fixed structural portion of one reactive element, at the same time is moving away from the other.

The force responsive element, of course, has a zero or rest position which it assumes in the absence of applied force. To make the output signal frequency start at zero with zero applied force, each oscillator is set to oscillate at the same frequency when the force responsive element is in its rest position. If this is done, it is found essential that the oscillators and their resonant circuits be electrically decoupled so that the frequency of one does not affect the frequency of the other, for which there is a tendency when the oscillators are operating at or near the same frequency. This does not present a big problem when the variable reactance elements of the transducers are capacitors, or when the oscillators are set to operate at significantly different frequencies at all times. However, in the case of inductors wherein the fixed portions comprise coils wound about open-ended cores that face opposite sides of the force responsive element and wherein the movable portion of each conductor comprises a body of magnetic material carried by the force responsive element, the problem can be severe when the oscillators are set to operate at or near the same frequency. This problem is solved by employing separate bodies of magnetic material connected on opposite sides of the force responsive element, and further by employing a compensating means interconnecting the outputs of the two oscillators.

With the foregoing construction, the non-linearities in the frequency response of each oscillator to deflection of the force responsive element substantially cancel; and, with both oscillators mounted in the transducer housing, the symmetry of the system permits temperature effects on the oscillator frequencies to cancel.

For many if not numerically most applications, the force responsive element of a transducer is designed for excursion only in one direction from its rest position. In accordance with the present invention, it is possible to further obtain an even more extreme linearity of output signal frequency variation with applied force under this condition. This is accomplished by offsetting the rest position of the force responsive element from the midpoint between the fixed portions of the reactive elements, so that the spacing in one reactive element is less than in the other when the applied force is zero. The direction of offset is opposite to the designed direction of excursion. The amount of the offset is approximately that required to center the locii of the designed excursion of the force responsive element between the fixed portions of the reactive elements, which is approximately one-half of the designed range of deflection of the force responsive element.

Referring now to the accompanying drawings.

Figure 1:
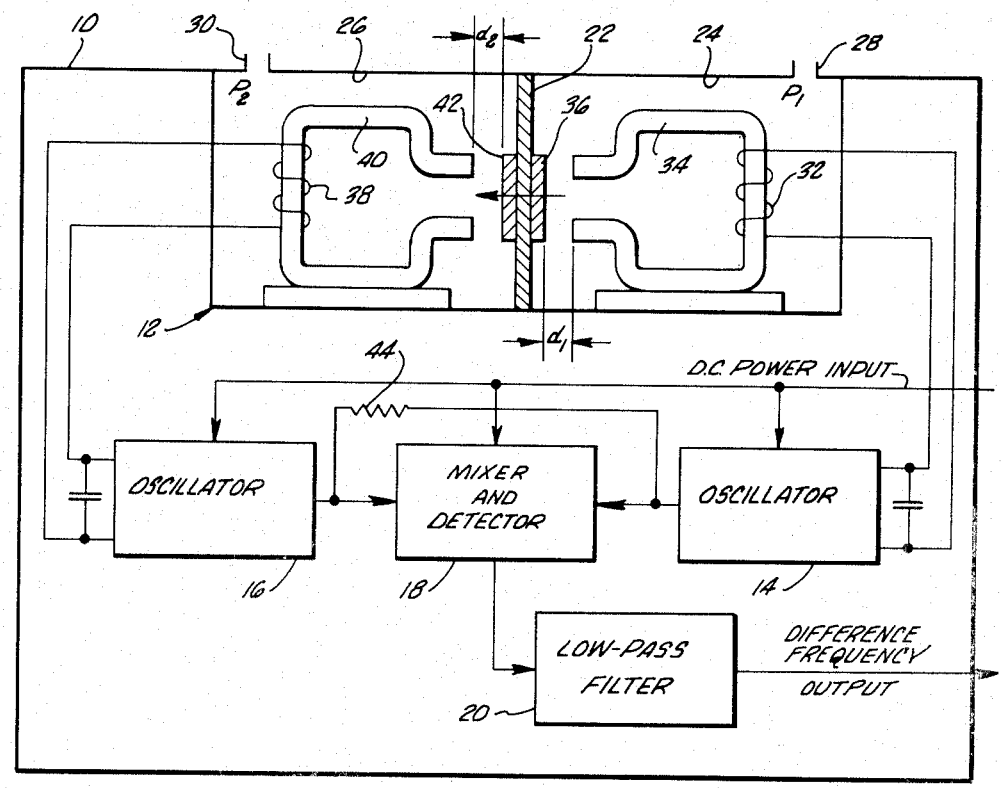
FIG. 1 is a schematic diagram illustrating the preferred embodiment of the invention.

Referring to FIG. 1, contained within a transducer housing 10 is a variable inductance transducer movement 12, first and second oscillators 14, 16, a mixer and detector circuit 18 and a low pass filter 20. The oscillators are identical, and conventional transistorized circuits are employed. The transducer movement 12 illustrated is available as Model 1–100 Pressure Transducer from Edcliff Instruments, Inc. of Monrovia, California, and is described in my co-pending U.S. patent application Serial No. 811,726, filed May 7, 1959 and entitled "Variable Reluctance Transducer."

The transducer movement 12 has a force responsive element 22 in the form of a deflectable pressure diaphragm which divides the interior of the movement housing into first and second chambers 24, 26. The first and second chambers 24, 26 may both be provided with ports 28, 30 respectively for admitting two pressure mediae whose pressures are designated $P_1$, $P_2$ respectively, whereby the device operates as a differential pressure transducer. On the other hand, the second port 30 may be closed and the chamber 26 evacuated to measure variations in the single pressure $P_1$ only. In a differential pressure transducer the diaphragm may move in either direction from a central rest position, depending upon which pressure is greater, $P_1$, or $P_2$. In those cases where $P_1$ is known to be always greater than $P_2$, and in those cases where variations in $P_1$ only are to be measured, the excursion of the diaphragm will be in one direction only from its rest position, as indicated by the arrow drawn through it.

Mounted in the pressure chambers 24, 26 are first and second variable inductors. The first variable inductor includes a fixed portion comprising a coil 32 wound about a portion of an open-ended core 34 which faces the diaphragm 22, and a movable portion comprising a body of magnetic material 36 carried by the force responsive element and spaced from the core 34 by an amount $d_1$ when the diaphrgam 22 is in its rest position. The second variable inductor includes a similar arrangement of a coil 38 wound about an open-ended core 40 which faces the opposite side of the diaphragm 22, and a separate body of magnetic material 42 carried by the diaphragm and spaced from the core by an amount $d_2$ when the diaphragm 22 is in its rest position. Diaphragm deflection in this type of instrument is only a few thousandths of an inch, as measured along a predetermined path indicated generally by the arrow drawn through the diaphragm. The cores and bodies of magnetic material are aligned on this path.

The coil 32 of the first variable inductor is connected as part of the parallel resonant tank circuit of the first oscillator 14. Variation in the spacing between its core 34 and magnetic body 36 varies the reluctance of the magnetic path around the coil 32 in conventional manner, which varies the inductance of the coil. Variations in the inductance of the coil 32 in turn varies the tuning of the tank circuit hence the frequency of the oscillator 14.

Similarly, the second variable inductor forms part of the parallel resonant circuit of the second oscillator 16. And, the tuning of the tank circuit hence the frequency of the oscillator 16 is varied similarly, though oppositely, by the same deflection of the diaphragm 22.

The oscillators 14, 16 preferably are set to operate at the same frequency when the diaphragm 22 is in its rest position. The transducer is provided with a D.C. power input as indicated. Excursion of the diaphragm 22 will alter the oscillator frequencies in opposite directions, and the mixer and detector circuit 18 to which the oscillator outputs are applied will derive a signal frequency equal to the difference in oscillator frequencies. Undesired components will be eliminated by the low pass filter 20 to which the output from the mixer and detector 18 is applied, resulting in a clean difference frequency output signal from the filter.

When the frequency difference approaches zero, mutual coupling through the diaphragm 22 tends to cause the oscillator frequencies to lock together. Hence, it is quite important to isolate the resonant circuits as well as possible, although under even the best circumstances some coupling is present. By employing separate bodies of magnetic material 36, 42 on opposite sides of the diaphragm 22, which bodies of magnetic material have a relatively high permeability compared to the material of the diaphragm, this trouble is reduced, although errors of up to 0.5% full scale may be encountered when the difference frequency of the oscillators is near zero. For example, a high nickel iron alloy, Hy Mu 80, containing about 80% nickel and 20% iron, is suitable for the magnetic bodies 36, 42. The diaphragm material may be a No. 416 stainless steel alloy, which has a relatively low permeability and has good spring characteristics. The magnetic bodies 36, 42 are each joined to the diaphragm by a single central spotweld (not shown).

Employing the above mentioned Model 1–100 variable reluctance pressure transducer movement, available from Edcliff Instruments, Inc., and with the diaphragm's rest position centered between the cores so that the gaps between the magnetic bodies and associated cores, $d_1$, $d_2$ are equal at about 0.005 inch each, the following test data illustrates the results which may be obtained; although better results are obtainable.

| | |
|---|---|
| Linearity | ±0.5% full scale. |
| Hysteresis | 0.25% full scale. |
| Zero drift with temperature | −0° F. to +250° F. <0.5%/100° F. |
| Sensitivity drift with temperature | −0° F. to +250° F. <0.5%/100° F. |
| Initial frequency of oscillators | Approx. 12,000 c.p.s. |
| Output frequency deviation | 2200 c.p.s. full scale. |
| Required power (transistorized circuits) | 4 ma. at 28 v.D.C. |

When the transducer is to be used in situations where diaphragm excursion only on one side of the rest position occurs, it is discovered that, by offsetting the rest position of the diaphragm from the mid-point between the two inductor cores, an even more extreme linearity can be obtained. The diaphragm is offset in the direction opposite to its designed excursion; for example, so that the gap $d_1$ in the first inductor is less than the gap $d_2$ in the second inductor. With applied force, the diaphragm moves in the direction of the arrow drawn through it, increasing the gap in the first inductor and decreasing the gap in the second inductor. With a 0.2 per unit increase in $d_1$ chosen as the maximum excursion for the diaphragm (a 20% increase), the best linearity is obtained where in the rest position $d_2$ equals about 1.15 $d_1$. If the maximum excursion for the diaphragm is chosen as 0.4 per unit $d_1$, best results are obtained when the diaphragm rest position is offset so that in the rest position $d_2$ equals about 1.42 $d_1$. Approximately, therefore, the amount of offset desirable for the rest position of the diaphragm is such that the locii of the designed excursion of the diaphragm is centered between the inductor cores. Or, in other words, the amount of offset is approximately one-half the designed excursion of the diaphragm. With proper diaphragm offset, it is possible to obtain an overall linearity better than ±0.1% full scale.

By discriminative coupling between the oscillator outputs, it is found possible to neutralize the error resulting from mutual coupling of the inductors in the zero frequency difference region. Accordingly a resistor 44 is connected between the oscillator outputs. The resistor 44 has a relatively high value of resistance, for example, 30,000 to 40,000 ohms. It introduces a certain amount of coupling between the oscillators, which coupling however is 180° out of phase with the coupling existing between the inductors. Hence the inductor coupling may be neutralized by an equal and opposite coupling through resistor 44, the resistance value of which is chosen specifically to accomplish just that. The resistor 44 acts, therefore, as a compensating or neutralizing means for the coupling existing through the diaphragm, the result being that the oscillators are effectively isolated. Employing this compensating arrangement, transducers with overall accuracies of about ±0.1% full scale have been assembled and tested.

Figure 2:
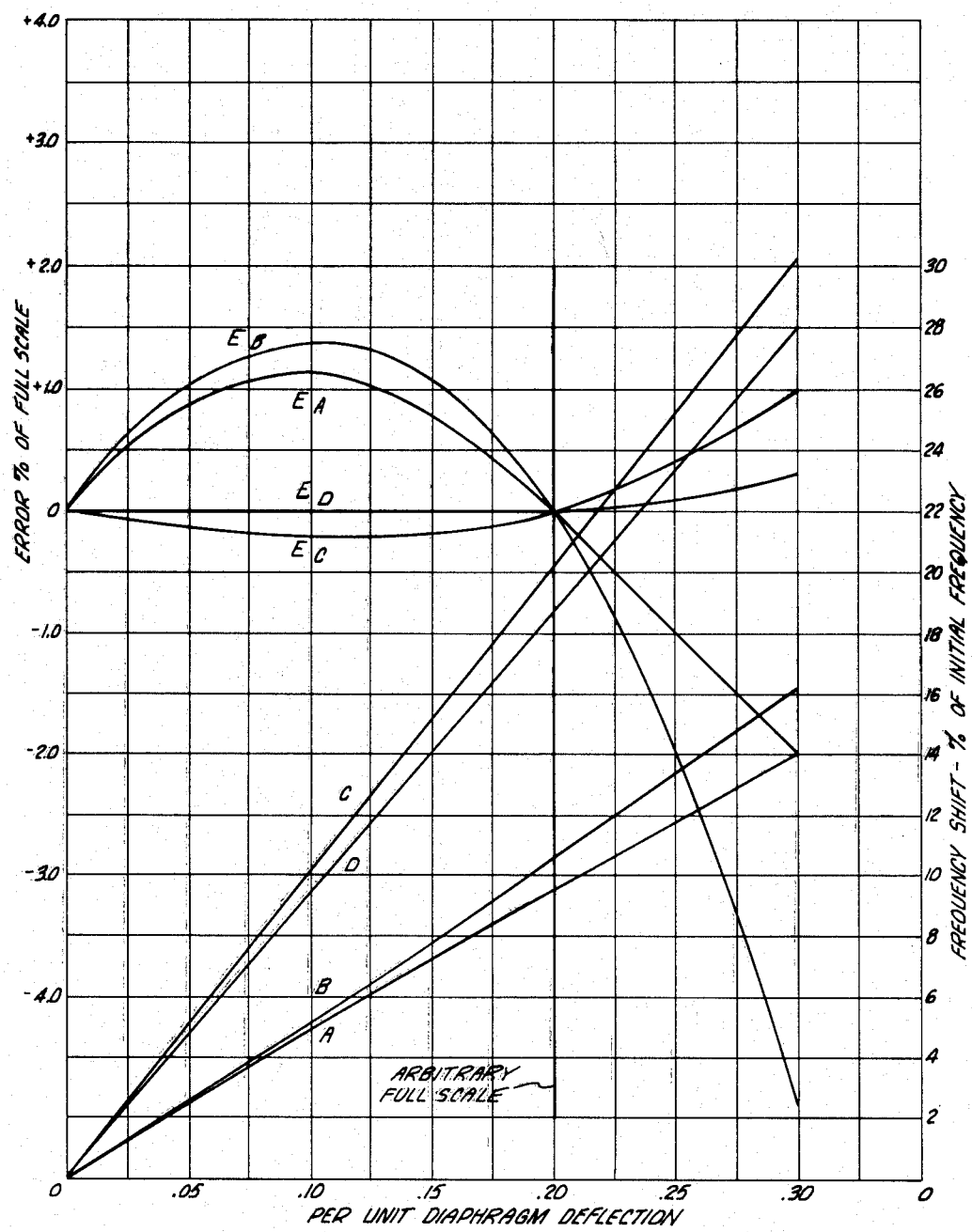
FIG. 2 is a graph illustrating the linearity of the output signal frequency with respect to diaphragm deflection for different constructions.

Referring to FIG. 2, the frequency response linearity for different arrangements is illustrated. Curve A represents the frequency shift with diaphragm deflection obtained from a transducer employing a single active coil with the gap between the core and magnetic body increasing, and curve B represents a single active coil device with the gap decreasing. It should be noted that curve A bows upwardly and curve B bows downwardly. Also, it should be noted that curve B is a negative curve but is drawn with positive ordinates for convenience. Assuming a 0.20 per unit diaphragm deflection as full scale, the deviations of curves A and B from straight lines drawn through zero and through the points of intersection of the curves with full scale are shown in terms of error percent of full scale by corresponding error curves $E_a$ and $E_b$ respectively. It is seen therefore, with a single coil device, a linearity error in excess of 1.0% full scale may be expected, which ruins the device as a digital or semi-digital transducer, because a calibration curve is required.

Curve C is the output from a two active coil transducer with the gap in one inductor increasing and the gap in the other simultaneously decreasing, the output being the difference frequency shift relative to diaphragm deflection. The error curve $E_c$ is very nearly linear, and illustrates that starting with equal gaps on both sides of the diaphragm the non-linearities in the two inductors almost cancel.

Curve D and its associated error curve $E_d$ illustrate the further improvement in linearity obtainable from offsetting the rest position of the diaphragm from center between the inductor cores so that the decreasing gap is equal to 1.15 times the increasing gap at the rest position. Here, the linearity error is hardly discernible, and is certainly less than 0.1% full scale.

A further advantage of employing the difference frequency system in the transducer is the extreme temperature stability obtainable, since temperature effects tend to offset one another. This is enhanced by employing transistorized circuits and mounting them in the transducer housing, as illustrated schematically in FIG. 1.

Figure 3:
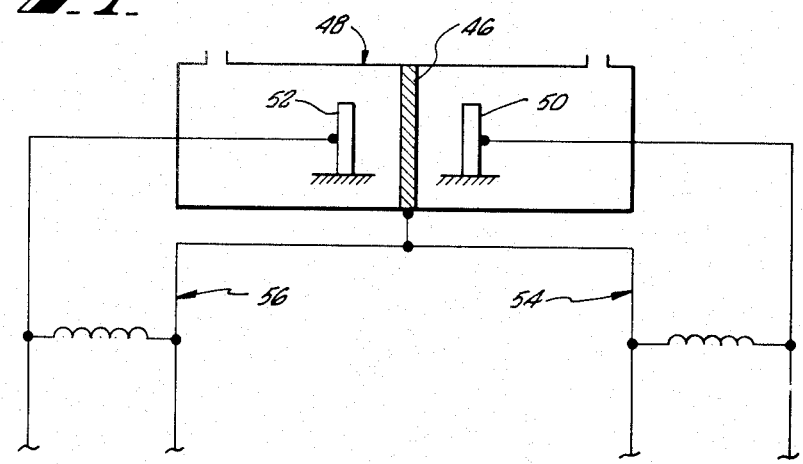
FIG. 3 is a schematic drawing illustrating a second embodiment of the invention wherein the variable reactive elements are capacitors.

Referring to FIG. 3, an alternative embodiment of the invention is fragmentarily illustrated. A deflectable diaphragm 46 of a transducer movement 48 forms a common plate for first and second variable capacitors having fixed capacitor plates 50, 52 respectively disposed on opposite sides of the diaphragm at spaced locations. Effectively therefore, the diaphragm 46 forms the movable plate of each capacitor. The first and second capacitors are connected respectively in parallel resonant circuits 54, 56 of first and second oscillators (not shown). The operation is analogous to that described with reference to the embodiment shown in FIG. 1.

I claim:

1. A transducer comprising a housing, a force responsive element which deflects in accordance with applied force mounted in said housing and defining first and second chambers, first and second reference oscillators each having a tuned circuit that controls the oscillator's frequency, means coupling the tuned circuit of the first oscillator to one side of the force responsive element for altering the tuning thereof in accordance with deflection of said force responsive element, means coupling the tuned circuit of the second oscillator to the opposite side of the force responsive element for oppositely altering the tuning thereof in accordance with the same deflection, and means coupled to the first and second oscillators for deriving an output signal frequency representative of the difference in oscillator frequencies.

2. A transducer which generates an output signal frequency representative of applied force, the combination which comprises a transducer housing, a force responsive element mounted in the housing and arranged to deflect along a predetermined path in accordance with the applied force, and defining first and second chambers, first and second oscillators each having a resonant circuit containing a similar individual variable reactive element for controlling the oscillator's frequency, said variable reactive elements being disposed on opposite sides of the force responsive element in alignment with said path, each of said variable reactive elements including a fixed structural portion and a movable structural portion the spacing between which determines the reactance of the element hence the frequency of the corresponding oscillator, the movable structural portion of each reactive element being carried by the force responsive element, whereby deflection of the force responsive element varies the frequency of each oscillator oppositely, and means coupled to the first and second oscillators for sensing the difference in oscillator frequencies to produce substantially linearly output signals in response to the deflections of the force responsive element.

3. Apparatus of claim 2 wherein the similar variable reactive elements are capacitors, each having a fixed plate and having a movable plate carried by the force responsive element.

4. Apparatus of claim 2 wherein the force responsive element has an undeflecter or rest position located midway between the fixed portions of the reactive elements so that the spacing in the reactive elements is equal when the net applied force is zero, and wherein each oscillator is set to oscillate at the same frequency when the force responsive element is in its rest position.

5. Apparatus of claim 2 wherein the force responsive element has an undeflected or rest position offset in one direction along said path from the midpoint between the fixed portions of the reactive elements so that the spacing in one reactive element is less than in the other when the applied force is zero, the amount of said offset being approximately one half of the designed range of deflection of the force responsive element in the opposite direction so that locii of the designed excursion of the force responsive element is approximately centered between the fixed portions of the reactive elements, and wherein each oscillator is set to oscillate at the same frequency when the force responsive element is in its rest position.

6. A transducer which generates a linear output signal frequency representative of applied force, the combination which comprises a transducer housing, a force responsive element mounted in said housing for deflecting along a predetermined path in accordance with the applied force and defining first and second chambers, first and second oscillators each having a resonant circuit containing a variable inductor for controlling the oscillator's frequency, said variable inductors being disposed on opposite sides of the force responsive element in alignment with said path, each of said variable inductors including a fixed structural portion and a movable structural portion the spacing between which determines the inductance of the inductor hence the frequency of the corresponding oscillator, the fixed portions of the inductors comprising coils wound about open-ended magnetic cores which face opposite sides of the force responsive element, the movable portion of each inductor comprising a body of magnetic material carried by the force responsive element, whereby deflection of the force responsive element varies the spacing between the fixed and movable portions of each inductor oppositely, means for compensating for magnetic coupling between the inductors, and means coupled to the first and second oscillators for deriving a signal having a frequency equal to the difference in oscillator frequencies.

7. Apparatus of claim 6 wherein the bodies of magnetic material comprising the moving portions of the inductors are separate bodies of relatively high magnetic permeability compared to the permeability of the force responsive element, and are connected on opposite sides of the force responsive element in alignment with their respective cores.

8. Apparatus of claim 6 wherein the force responsive element has an undeflected or rest position offset in one direction along said path from the midpoint between the fixed portions of the inductors so that the spacing between the movable and fixed portion of one inductor is less than in the other when the applied force is zero, the amount of said offset being approximately one half of the designed range of deflection of the force responsive element in the opposite direction so that the locii of the designed excursion of the force responsive element is approximately centered between the fixed portions of the inductors, and wherein each oscillator is set to oscillate at the same frequency when the force responsive element is in its rest position.

References Cited in the file of this patent

UNITED STATES PATENTS

| | | |
|---|---|---|
| 2,240,452 | Wolfskill | Apr. 29, 1941 |
| 2,371,040 | Fisher et al. | Mar. 6, 1945 |
| 2,371,626 | Kecskemeti | Mar. 20, 1945 |
| 2,986,715 | Church et al. | May 30, 1961 |
| 3,017,579 | Brack | Jan. 16, 1962 |